No. 829,652. PATENTED AUG. 28, 1906.
A. O. JOHNSON.
BLUING SPOON.
APPLICATION FILED JULY 6, 1905.

Witnesses
J. C. Simpson.
E. M. Colford

Inventor
Alvin O. Johnson
By Chandler & Chandler
Attorneys

UNITED STATES PATENT OFFICE.

ALVIN O. JOHNSON, OF CHICAGO, ILLINOIS.

BLUING-SPOON.

No. 829,652.　　　Specification of Letters Patent.　　　Patented Aug. 28, 1906.

Application filed July 6, 1905. Serial No. 268,535.

*To all whom it may concern:*

Be it known that I, ALVIN O. JOHNSON, a citizen of the United States, residing at Chicago, in the county of Cook, State of Illinois, have invented certain new and useful Improvements in Bluing-Spoons; and I do hereby declare the following to be a full, clear, and exact description of the invention, such as will enable others skilled in the art to which it appertains to make and use the same.

This invention relates to bluing-spoons.

One object of the invention is to provide a device embodying such characteristics that an ordinary spoon may be employed for bluing purposes.

Another object of the invention resides in the provision of a perforated plate provided with clips for attachment to the bowl of an ordinary spoon between which plate and bowl the bluing material may be stored.

Figure 1:
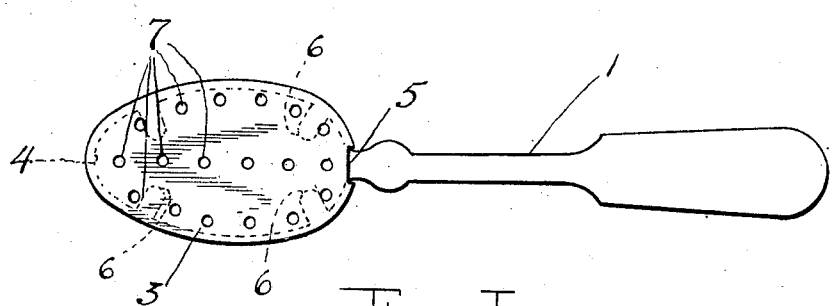
Figure 2:
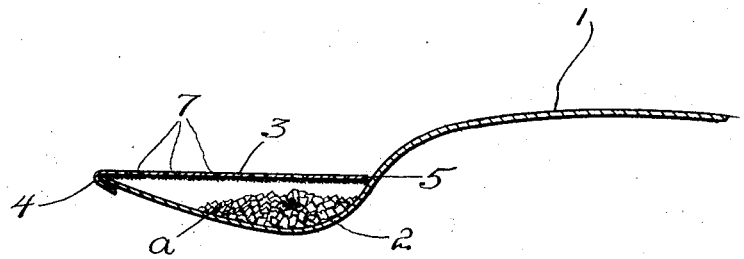
Figure 3:
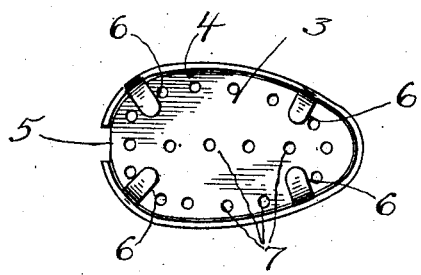

In the drawings, Figure 1 is a top plan view of my invention applied to a spoon. Fig. 2 is a longitudinal section of a spoon equipped with the present invention. Fig. 3 is a bottom plan view of the attachment.

Referring now more particularly to the accompanying drawings, it will be seen that the present invention comprises an ordinary spoon including a handle 1 and bowl 2.

The bluing material $a$ is placed within the bowl 2 of the spoon and is prevented from displacement through the instrumentality of a plate 3, which is provided with a marginal flange 4, which terminates at the notch 5 at one end of the plate, the notch being formed so that it may embrace the inner end of the handle 1 to provide a complete covering of the bowl by the plate 3. Extending from the flange 4 of the plate 3 are a series of resilient or bendable fingers 6, which are designed to embrace the corresponding edges of the bowl 2 of the spoon to prevent displacement of the plate 3 with respect to the spoon.

It will now be understood that the bluing material $a$ is arranged within the bowl 2 of the spoon between it and the plate 3. Now in order to permit the bluing material to have a necessary and desired effect upon the water in which the spoon is to be dipped for coloring purposes I provide the plate 3 with any desired number of perforations 7. In order to prevent too much of the bluing material passing through the perforations 7, I employ a piece of wire or fabric gauze X within the marginal flange 4 of the plate 3 directly over the perforation 7. By reason of these perforations and gauze which is preferably of a finer mesh than the perforations and arranging the gauze against the under face of the plate 3, it is obvious that the deisred quantity of bluing material will pass from the bowl of the spoon when the latter is dipped into the water, the marginal flange 4 of the plate 3 keeping the bluing material from passing over the edge of the bowl 2 of the spoon. As shown, the fabric X is gripped between the plate 3 and the bowl 2.

Of course I make no claim to the spoon alone, but I will claim my invention in combination with a spoon. However, it is to be understood that I will also claim my invention, which resides in the plate and its adjunctive parts, separately as an independent article of manufacture for the reason that my invention embodies such characteristics that it may be sold separately for use in connection with spoons of different characters. I wish it understood also that instead of the plate 3 having the perforations therein I may employ any suitable foraminous material shaped to conform to the outline of the spoon-bowl and that under any and all circumstances either the plate or the foraminous material may be readily applied by reason of the bendable or flexible fingers to any form of bluing-stick. The bluing-sticks are used especially for stirring purposes, and it is obvious that the spoon in this instance may be of any suitable material and used in the same manner in every particular as is an ordinary bluing-stick.

What is claimed is—

1. A spoon attachment including an oval-shaped plate arranged for disposal upon the bowl of a spoon, said plate having perforations therein, and having bowl-engaging fingers arranged for engagement of the spoon-bowl to hold the attachment in position.

2. A spoon attachment comprising a perforated plate having a peripheral flange arranged for the reception of a spoon-bowl therewithin, and bendable bowl-engaging fingers.

3. The combination with a spoon including a handle and a bowl, of a perforated plate provided with a peripheral flange engaged with the edge of the bowl of the spoon and also provided with a notch in which the base of the handle of the spoon is engaged, fingers constructed and arranged for engagement with the bowl of the spoon and gauze material arranged against the under face of said plate.

4. A removable cover for spoons consisting of a piece of foraminous material shaped to conform to the outline of the spoon-bowl and having radiating flexible fingers at intervals of its margin to be bent against the bottom of the spoon-bowl.

5. The combination with a spoon including a handle and a bowl, of a piece of foraminous material shaped to conform to the outline of the spoon-bowl and having fingers at intervals of its margin to be bent against the bottom of the spoon-bowl.

6. The combination with a spoon, of a plate disposed upon the bowl thereof to close the latter, said plate having a plurality of perforations therein, means for holding the plate in position, and a piece of fabric disposed against the under face of the bowl, said fabric being engaged between the edges of the bowl and the plate.

In testimony whereof I affix my signature in presence of two witnesses.

ALVIN O. JOHNSON.

Witnesses:
E. F. JACKSON,
W. A. MILLER.